June 21, 1966    J. E. LINDBERG, JR    3,256,686
METHOD AND APPARATUS FOR POWER TRANSMISSION AND ACTUATION
Original Filed Sept. 30, 1960    5 Sheets-Sheet 1

INVENTOR.
JOHN E. LINDBERG
BY
ATTORNEY

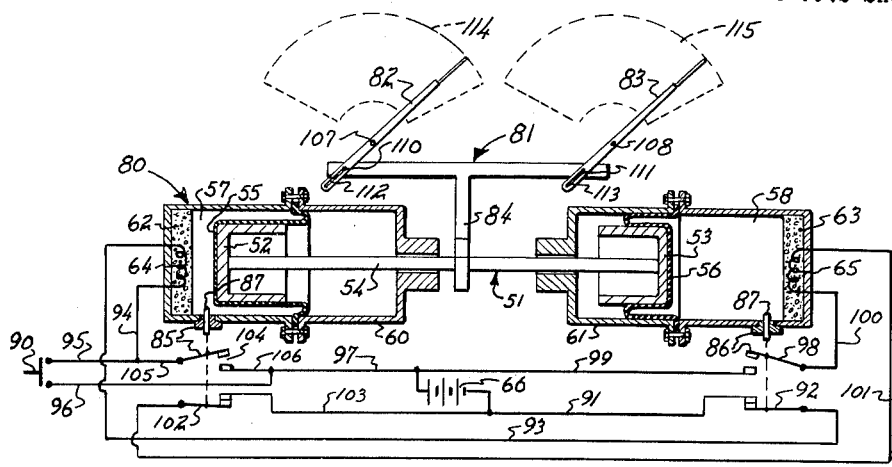

June 21, 1966   J. E. LINDBERG, JR   3,256,686
METHOD AND APPARATUS FOR POWER TRANSMISSION AND ACTUATION
Original Filed Sept. 30, 1960                    5 Sheets-Sheet 3

INVENTOR.
JOHN E. LINDBERG
BY
ATTORNEY

June 21, 1966     J. E. LINDBERG, JR     3,256,686
METHOD AND APPARATUS FOR POWER TRANSMISSION AND ACTUATION
Original Filed Sept. 30, 1960     5 Sheets-Sheet 4

INVENTOR.
JOHN E. LINDBERG

BY

ATTORNEY

June 21, 1966   J. E. LINDBERG, JR   3,256,686
METHOD AND APPARATUS FOR POWER TRANSMISSION AND ACTUATION
Original Filed Sept. 30, 1960   5 Sheets-Sheet 5

INVENTOR.
JOHN E. LINDBERG
BY
ATTORNEY

United States Patent Office 3,256,686
Patented June 21, 1966

3,256,686
METHOD AND APPARATUS FOR POWER TRANSMISSION AND ACTUATION
John E. Lindberg, Jr., 1211 Upper Happy Valley Road, Lafayette, Calif.
Original application June 3, 1964, Ser. No. 372,248, which is a division of Ser. No. 60,250, filed Sept. 30, 1960. Divided and this application Apr. 27, 1965, Ser. No. 461,220
9 Claims. (Cl. 60—25)

This application is a division of application Serial Number 372,248, filed June 3, 1964, which was a division of application Serial Number 60,250, filed September 30, 1960, now abandoned, which was a continuation-in-part of application Serial Number 759,717, filed September 8, 1958, now abandoned.

This invention relates to improvements in method and apparatus for power transmission and actuation. It can be used to actuate any device capable of applying mechanical force, including hydraulic systems, gas turbines, loudspeakers, valve actuators, and the like.

Conventional power transmission and actuator systems are generally bulky and excessively heavy. They are complex units, expensive to overhaul and repair. The operation of many of them depends upon liquids or gases that either have to be contained in rather large reservoirs to provide potential energy or have to be circulated by pumps. In addition, many systems require close-fitting leak-proof seals which are subject to failure at elevated temperatures. Often, special fittings, valves, and transmission lines are required as integral parts of the actuator unit.

Adequate power transmission systems are vital on modern aircraft, where they are used for retracting and lowering the landing gear, flap control, afterburner control and many other things. But the actuator systems heretofore available have proved inadequate in the high-temperature environment experienced by high-speed aircraft and by guided missiles. Consequently, major aircraft companies have been trying to develop 3000-p.s.i. actuator systems able to operate between —65° F. and 1000° F. Much current research is directed toward development of hydraulic systems capable of operating in these environments, but performance data on hydraulic pumps indicate that, as yet, no dependable pump has been developed which will function properly over the full —65° F. to 1000° F. range. Even if there were such pumps, contemporary hydraulic fluids are, at best, able to perform satisfactorily only within the range of —100° F. to 700° F., while the seals that are necessary in a hydraulic system have a relatively short life at 700° F.

Moreover, hydraulic systems have many disadvantages, even if able to function properly. A pump external to the actuating system is necessary, as are hydraulic accumulators in some cases; high pressure fittings, control valves, and transmission lines must be installed as an integral part of the system and these result in excessive bulk and weight. The fluids involved often constitute a fire hazard, and the system must be primed before operation. In addition, when replacing a defective unit because of a breakdown, other parts of the system are often affected, resulting in expensive procedures.

One object of this invention is to provide an actuator (i.e., power-transmission) system capable of satisfactory operation at both (1) elevated temperatures in the range of 1000° F. and higher and at high pressures and (2) low temperatures (e.g. —65° F.) and at low pressures. Another object is to provide an actuator that does not depend upon liquids of any kind. It achieves these objects by utilizing certain thermodynamic properties of special classes of materials to alter the internal pressure of a container in which they are enclosed, in accordance with the temperature of the materials.

The actuating systems of this invention are simpler, more compact, and more economical to operate than conventional systems, and do not depend upon external pumps or reservoirs.

A further aim of this invention is to provide actuating systems requiring no valves, fittings, or fluid or vapor transmission lines, as do numerous present-day actuators, and requiring no priming operations.

Over and above eliminating many disadvantages of conventional actuating systems, as well as solving the problem of elevated temperature and pressure actuation, this invention presents a much smaller fire hazard than other contemporary systems, and will function with any source or sink of heat.

Other objects and advantages of the invention will appear from the following detailed description of some preferred embodiments thereof.

In the drawings:

FIG. 6 is a view in elevation and partly in section of a windshield wiper powered by a dual-unit actuator like that of FIG. 3.

FIG. 7 is a fragmentary and generally schematic view of a part of an actuator like those of FIGS. 1–6, but provided with an alternating-current type of electrical heater.

FIG. 8 is a view like FIG. 7 showing a radio-frequency type of electrical heater.

FIG. 9 is a view like FIG. 7 showing an actuator heated by a flame.

FIG. 10 is a view like FIG. 7 of an actuator utilizing solar heat.

FIG. 17 is a fragmentary view in elevation and in section of a portion of modified form of actuator of this invention.

GENERAL PRINCIPLES OF THE INVENTION

Figure 1:
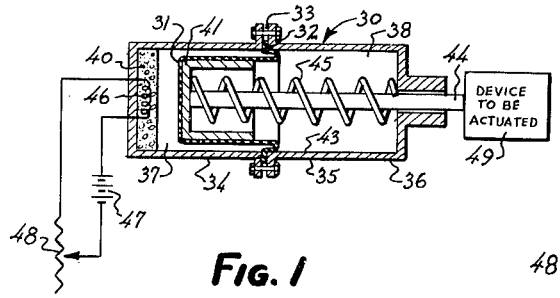
FIG. 1 is a view in side elevation and in section of an actuator embodying the principles of this invention and incorporating a single-unit bellows-diaphragm type of actuating device for control by temperature variation. The actuator is shown in its contracted position, and an accompanying electrical circuit is indicated diagrammatically.

Metallic hydrides are capable of ingassing (taking in gas in either a chemical or physical action) or degassing (also called "outgassing"), upon the application or removal of heat. For example, certain classes of hydrides release large amounts of hydrogen solely as a result of the application of heat, while other hydrides absorb hydrogen solely because of the application of heat. Although this phenomenon has been observed for many years, about the only application of it, heretofore, has been in the electronic tube industry, where "getters" take up the residual gases remaining in the tubes after the tubes have been sealed. However, as will be seen, these ingassing or outgassing substances, hereafter termed as "gas-transfer agents," represent, under the right conditions, a very useful means for storing energy. Moreover, this energy may be converted to perform useful work whenever desired by varying the temperature or pressure conditions.

One way of utilizing this phenomenon is to enclose a gas-transfer agent of this invention in a container of variable dimensions, so constructed that the dimensions always conform to equilibrium conditions, i.e., to a balance of the internal forces against the external forces. The application of heat to such an enclosed gas-transfer agent then results in the alteration of the internal pressure within the container due to the emission of the gas from the gas-transfer agent, with the consequence that the container dimensions alter in order to maintain equilibrium. This dimensional alteration is accomplished by movement of some part of the container, and this movement can be used to "actuate" or cause movement of another device which will perform useful work.

A few devices of variable dimensions suitable for my invention will be discussed in detail below. Before considering them, however, it is desirable to enquire into the general properties of the gas-transfer agents suitable for this invention.

GAS SORPTION

There are at least three mechanisms by which gases or vapors may be taken up by a solid. (1) The solid may chemically react with the gas or vapor. (2) The solid may physically adsorb the gas; then the gas condenses as a layer on the surface of the solid. (3) The solid may physically absorb the gas; then gas enters into the interior of the solid in much the same manner as gas dissolving in a liquid. In many cases, the solid may take up gas by both adsorption and absorption, and in many cases it is difficult to determine the exact nature of the mechanisms involved; so the generic term *sorption* and its derivatives *sorptive, sorbent,* etc., are used to include both or either of absorption and adsorption. Materials differ widely with respect to their capacity for sorption or desorption. Some reactions are irreversible; that is, once a gas or vapor is sorbed (or desorbed) by some solids under the initiating circumstances, it cannot be desorbed (or re-sorbed) except under the most extreme treatment; with certain other classes of substances, sorption and desorption of a gas or vapor is reversible and can be made to occur repetitively for an unlimited number of cycles.

For every sorptive condition of a mixture of a gas or vapor and a sorbent substance, at any one temperature, there is a certain presure at which this mixture will be in thermodynamic equilibrium. When the gas or vapor (sometimes both) is a thermodynamic phase of the sorbent substance, this pressure is often called the "equilibrium pressure"; when the gas is not necessarily native to the sorbing substance, this pressure is often called the "dissociation pressure"; however, I shall use the terms interchangeably. It is generally true that under equilibrium conditions a change in any one thermodynamic variable causes a change in the others. Thus, the equilibrium pressure may be varied by changing the temperature.

When a gas or vapor is sorbed or goes into solution in the occluding substance, heat is evolved or absorbed in the reaction, the reaction being termed exothermic if heat is evolved and endothermic if heat is absorbed. The heat evolved or absorbed is termed the "heat of solution." In an exothermic reaction, the sorbing substance may be made to give up its gas when heat is added. In an endothermic reaction, the sorbing substance may be made to occlude gas when heated.

SORPTION OF HYDROGEN BY METALS

The phenomenon of sorption of hydrogen by metals merits special consideration because, as will be explained below, many metallic hydrides contain a vast quantity of hydrogen, so that great energy is available. Furthermore, hydrogen is the most mobile of gases, so that it moves quickly to actuate quickly. The action is reversible for indefinite recycling, is rapid in both directions, and can be obtained over a wide range of temperatures by proper selection of the metal to be used. The sorption may be adsorption, absorption, or diffusion into the metal. In general, finely powdered metals take up gases to a much greater extent than solid forms of the metal, because a much greater surface area is available for interaction. For example, Table I shows an isobar for the adsorption of hydrogen by nickel powder.

Table I.—*Adsorption of hydrogen on nickel powder*

[At a pressure of 600 mm. of mercury]

| Temperature in ° C.: | Solubility in cubic centimeters of gas per 100 grams of nickel |
|---|---|
| −100 | 31.5 |
| −50 | 29.5 |
| 0 | 27.0 |
| 50 | 24.5 |
| 100 | 22.5 |
| 150 | 20.5 |

Paralleling the phenomenon of physical sorption, there are numerous cases in which hydrogen reacts with metals to form compounds or solutions of the gas in the solid or liquid metal. There are several different types of interaction between hydrogen and the elements: With the elements of the main groups IV through VII of the periodic chart, covalent hydrides are formed such as hydrogen sulfide, arsenic hydride, and silicon hydride. In addition, complex hydrides are also formed by boron and one or more elements chosen from the group consisting of the main groups IV through VII of the periodic chart. The borohydrides (whose general formula is $M_x(BH_4)_y'$ where M is a metal and $x$ and $y$ are valence integers) are relatively stable liquids and solids. They are characterized by relatively small densities and wide variation in ranges of heats of formation.

With the alkali and alkaline earth metals, i.e., groups I-a and II-a of the periodic table, hydrogen forms stoichiometric compounds such as sodium hydride and calcium hydride. These are ionic in behavior, with hydrogen as the negative ion. The reactions are reversible and exothermic and are especially useful in this invention.

Hydrogen reacts with aluminum to form aluminum hydride and complex alumino hydrides such as lithium alumino hydride, magnesium alumino hydride, and sodium alumino hydride.

With the elements of groups I-b, II-b, VI-a, VII-a, and VIII-a (except palladium), hydrogen forms true solutions as indicated by (a) the observation that the solubility varies as the square root of the pressure and (b) the increase in solubility with increase in temperature. Metals of these groups are designated as Group A metals. Table II gives representative solubility of hydrogen in some Group A metals.

*Table II.—Solubility (cm.³/100 g.) of hydrogen at 1 atmosphere pressure in typical metals of Group A*

| T, °C. | Ni | Cr | Cu |
|---|---|---|---|
| 200 | 1.70 | | |
| 400 | 3.15 | | 0.06 |
| 600 | 5.25 | 0.5 | 0.30 |
| 1,000 | 9.80 | 3.0 | 1.58 |
| 1,400 | 16.2 | | 11.8 |
| 1,500 | 41.6 | | 13.6 |
| Vg (800) | 0.69 | 0.071 | 0.066 |

Vg = cc. of hydrogen per cc. of hydride at 800° C.

With the elements of Groups III-a (including the rare earth and actinide elements), IV-a and V-a, hydrogen forms pseudo-hydrides. While the solubility of hydrogen in elements of these groups varies as the square root of the pressure, it decreases with increase in temperature. Above about 300° C., palladium also behaves this way. Elements of these groups are designated as Group B. Table III illustrates the sorption of hydrogen in selected Group B metals.

*Table III.—Sorption of hydrogen by typical metals of Group B*

[In cm.³ (S.T.P.) per gram, at 1 atm.]

| T, °C. | Ti | V | Zr | Th |
|---|---|---|---|---|
| 20 | 407.4 | 150 | 235.5 | 148 |
| 400 | 387.7 | 38 | | |
| 600 | 334.7 | 10 | 184 | 91 |
| 800 | 140.9 | 4.4 | 165 | 81 |
| 1,000 | 66.1 | 2.5 | 78 | 26 |
| d | 4.52 | 5.87 | 6.4 | 11.2 |
| Vg | 1,800 | 900 | 1,525 | 1,660 |

Vg = cc. of H₂ per cc. hydride at 20° C.
d = density of the metal.

Although the reactions in both Group A and Group B are perfectly reversible, a very desirable property in itself, the solubilities of hydrogen in Group B metals are about 1,000 to 10,000 times those of hydrogen in Group A metals, as may be seen from Tables II and III. The solubility in both groups varies with the square root of the pressure, but in Group B the solubility decreases with rise in temperature and the reaction is exothermic, while in Group A the solubility increases with rise in temperature and the reaction is endothermic. Thus, if a sample of titanium hydride, which has been fully ingassed at room temperature, is heated at one atmosphere pressure to 1000° C., an amount of hydrogen equivalent to 341 cc. of hydrogen per gram of hydride at standard temperature and pressure will be given up by the sample. Theoretical relationships for the solubility of hydrogen as a function of pressure and temperature, derived by the methods of statistical mechanics, have been deduced by Fowler and Smithells.

For metals of Group A, the solubility S is given by the equation, $$S = \frac{16.2 \times 10^3 \sqrt{P_{atm}}}{T^{1/4} d} \exp\left(-\frac{Q}{1.98 T}\right)$$

(Equation 1)

where $S$ = solubility reckoned at standard temperature and pressure,
$P$ = pressure in atmospheres,
$Q$ = heat of solution in calories per mole of $H_2$,
$T$ = temperature in degrees Kelvin,
$d$ = density of the metal.

For metals of Group B:

$$\frac{S}{S_0 - S} = \frac{48.2 \sqrt{P_{atm}}}{T^{1.75}} e^{\frac{Q}{1.98 T}}$$

(Equation 2)

where $S_0$ = solubility at saturation at room temperature and the other symbols have the same meaning as in Equation 1.

The values of Q to be used for metals of Group B may be found from Table IV. The calculated values of S are found to be about plus or minus 10% those observed; that is, the values listed in Tables II and III.

*Table IV*

Metal:            Q cal./mole $H_2$
Ti—10,000 _____ for T<600° C. use 15,000.
Zr—17,500 _____
Th—22,500 _____ for T<800° C. use 18,600.
V—7,700 _____ for T<350° C. use 9,100.

SPECIAL ADVANTAGES OF METALLIC HYDRIDES

While other solids absorb gases and while there are other ways of obtaining pressure increases with temperatures, metallic hydrides possess some important special advantages. The vaporization of liquids and the pressure increases of gases due to temperature increases have been used in actuators, but they require special treatments and have many known disadvantages, some of which already have been commented on. As to the other solids, they tend to be restricted in usefulness, low in power output, slow to act, and tend to lose their ability to perform repeatedly.

The metallic hydrides are very quick to respond—one actuator I have built has actuated and de-actuated at sixty cycles per second. Many hydrides contain vast volumes of hydrogen—some have over 1700 times the volume of the metal hydride. The reaction is not only reversible; it is capable of indefinite recycling, thousands or hundreds of thousands of times. The hydrides can be used to actuate at very high temperatures, and in an environment where the pressure is very high, where, again, conventional actuators are useless.

GENERAL APPLICATION OF GAS-TRANSFER AGENTS TO THE PROBLEM OF ACTUATION

My invention provides means for altering the internal pressure of any closed container. If the container has dimensions which are variable with internal pressure, then the resultant change of volume due to change in internal pressure can be utilized to activate a suitable device. The container of variable dimensions used in this manner thus becomes an actuator.

There are, as previously explained, many hydrides, and their equilibrium gas or vapor content varies with temperature and pressure. In general, the equilibrium pressure and temperature have a one-to-one correspondence. Hence, by inserting an ingassed or degassed gas-transfer agent within a closed container, the internal pressure of the unit may be varied by the simple expedient of heating or cooling the gas-transfer agent.

An analytical expression has been developed for the purpose of calculating the change in volume of a container of variable dimensions resulting from changing the temperature of a specified amount of enclosed gas-transfer agent. The internal volume of the container is conveniently referred to as the "loading chamber." The equation, which may be referred to as "the loading-chamber equation" or "Equation 3" is:

$$\Delta V = \left[ d\Delta S_{P,T} + 1 - \frac{P_0 T}{P T_0} \right] V_h - V_0 1 - \frac{P_0 T}{P T_0}$$

(Equation 3)

where $d$ is the density of unsaturated gas-transfer agent, in grams per cc.
$P_0$ is the initial pressure of the loading chamber in atmospheres
$T_0$ is the initial temperature of the loading chamber, in ° Kelvin
$P$ is the final pressure of the loading chamber, in atmospheres
$T$ is the final temperature of the loading chamber, in ° Kelvin
$\Delta S_{P,T}$ is the change in gas or vapor content of the gas-transfer agent, in cc., when pressure and temperature are varied from $P_0$, $T_0$ to $P,T$
$V_0$ is the initial volume, in cc., of the loading chamber at pressure $P_0$ and temperature $T_0$
$V_h$ is the volume, in cc., of the gas-transfer agent in the loading chamber
$V$ is the volume, in cc., of the loading chamber at pressure $P$ and temperature $T$
$\Delta V$ is $V - V_0$, which is the change in volume of the loading chamber, in cc.

It is understood that initially the gas-transfer agent in the loading chamber is surrounded by, and is in equilibrium with, either an inert gas or vapor, or with a gas or vapor of the same chemical composition as that contained in, or to be released by, the gas-transfer agent. Helium, argon, xenon, and neon are typical suitable inert gases.

The hydrides of Group B are highly superior gas-transfer agents, since their solubilities are rather large, and the reactions are reversible, which means that volume changes can be effected by varying the pressure and temperature in either direction. The equation for the solubility of hydrogen in metals of Group B has been given above; the reaction is exothermic. From the previously given Equation 2, the following equation for $\Delta S_{T,P}$ may be obtained:

$$\Delta S_{T,P} = \frac{3.66 \times 10^{-3} T S_0}{P\left[1 + \frac{48.2P}{T^{1.75}} e^{\frac{Q}{1.98T}}\right]}$$

(Equation 4)

where P and T are in the same units as in the loading-chamber equation.

Several values of $\Delta V$ based on the hydrides of Group B calculated from the preceding equations for a series of temperatures and pressures are listed in Table V for a few hydrides.

Table V

| Hydride | $P_0$, atm. | $T_0$, ° C. | $P$, atm. | $T$, ° C. | $V$ |
|---|---|---|---|---|---|
| V | 1 | 20 | 5.1 | 200 | $37.2 V_h - 0.7 V_0$ |
| Zr | 1 | 20 | 204 | 600 | $1.11 V_h - 0.98 V_0$ |
| Ti | 1 | 20 | 204 | 1,000 | $38 V_h - 0.98 V_0$ |
| Ti | 1 | 20 | 2,500 | 2,000 | $6.9 V_h - V_0$ |
| Zr | 10 | 100 | 204 | 1,000 | $10.4 V_h - 0.8 V_0$ |
| Ti | 50 | 200 | 204 | 1,000 | $37.5 V_h - 0.34 V_0$ |
| V | 1 | −30 | 10 | 0 | $0.89 V_h - 0.88 V_0$ |

It can be seen from Table V that large pressures are capable of being developed in a chamber at elevated temperatures. This statement has been verified by me in my laboratories where I observed that upon heating 2.37 grams of zirconium hydride enclosed in a volume of 5 cm.³ with an initial pressure of 1 atm., an internal pressure of 1200 p.s.i.g. was developed. Some of these regions of pressure and temperatures are well above those required for aircraft actuation.

One of the unique features possessed by my invention is the fact that the rate of ingassing of many hydrides is enhanced by increasing the initial equilibrium pressure $P_0$ surrounding the hydride. In fact, the rate of ingassing increases linearly with pressure over a very wide range. The usefulness of this phenomenon lies in the fact that cyclic rates of ingassing and degassing may be varied effectively by varying the initial internal equilibrium pressure. One of the inert gases, previously referred to, may be chosen to perform this function. The inert gases possess an important advantage over hydrogen in that, with many materials, the diffusion rate of the inert gases is negligibly small in comparison with hydrogen. This means that, in a hydride employed as a gas-transfer agent within the loading chamber, the replacement of some of the hydrogen with an inert gas within the chamber will reduce effectively the chance of loss of hydrogen by diffusion through the material. Application of this fact may be made to several of the applications of my invention which will shortly be discussed in detail.

THE SINGLE-UNIT ACTUATOR 30 OF FIGS. 1 AND 2

Figure 2:
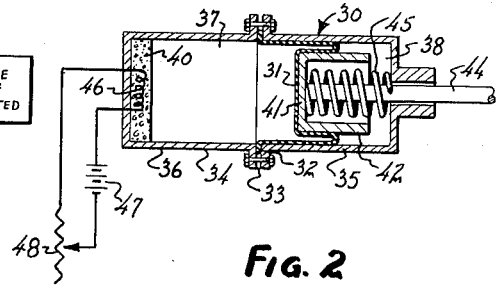
FIG. 2 is a view like FIG. 1 of the same actuator in its expanded position.

An actuator 30 of variable dimensions suitable for application of my invention is depicted schematically in FIGS. 1 and 2. This actuator 30 utilizes a special type of diaphragm 31, namely, a long-stroke, deep-convolution, constant-area diaphragm which is free positioning, with complete relaxation within its stroke and very responsive to small pressure changes. A suitable such diaphragm is sold under the trademark "Bellofram" by the Bellofram Corporation, Burlington, Massachusetts. The Bellofram disphragm 31 comprises elastomeric material in which high-tenacity pressure-cords of suitable fabric are embedded.

In FIG. 1, the diaphragm 31 is used as a seal in a piston-cylinder arrangement. The outer periphery 32 of the diaphragm 31 is clamped securely in a groove 33 between two parts 34 and 35 of a cylinder 36 and divides the cylinder 36 into a loading chamber 37 and a piston chamber 38.

My invention uses a gas-transfer agent 40 to vary the pressure in the loading chamber 37 in accordance with the temperature of the gas-transfer agent 40. As the pressure in the loading chamber 37 is increased, a loose-fitting piston 41 on the opposite side of the diaphragm 31 moves out, causing the diaphragm 31 to roll off the piston side wall 42 and onto the side wall 43 of the cylinder 36, with a smooth and continuous action. Thus it moves the piston 41 and its stem 44 outwardly. If the pressure is released in the loading chamber 37, a spring 45 moves the piston 41 inwardly, which, in turn, causes the diaphragm 31 to roll off the cylinder side wall 43 onto the piston side wall 42.

The change in volume $\Delta$, as discussed in the preceding section, may refer to the loading chamber 37. Then the volume change takes place unilaterally, i.e., the motion of the piston 41. Under these conditions, the length of stroke of the piston 41 may be calculated from the relation:

$$L = \frac{\Delta V}{A_{\text{eff}}}$$

(Equation 5)

where L is the length of stroke, $A_{\text{eff}}$ is the effective area of piston or bellows in cm.², and $\Delta V$ is as in Equation 3.

Heat may be applied to the gas-transfer agent 40 by a filament 46, which is connected to a battery 47, through a potentiometer 48. The temperature of the gas-transfer agent 40 may be varied as desired by the potentiometer 48. As the temperature of the gas-transfer agent 40 is raised, the released gas therefrom raises the internal pressure in the loading chamber 37, and thus the piston 41 is extended against the pressure exerted by the spring 45. As a result, the the piston 41 is moved to the FIG. 2 position. (As was stated previously and will be shown later, degassing of the gas-transfer agent 40 may be accomplished by any source of heat. Thus the filament-battery-potentiometer circuit is only one of several possible heat sources.)

When the temperature of the gas-transfer agent 40 is lowered by the potentiometer 48, the internal pressure in the loading chamber 37 decreases, due to ingassing, and the spring 45 returns the piston 41 to its contracted position of FIG. 1. The piston 41 may be connected by its stem 44 to a device 49 to be actuated, and the stroke of the piston 41 constitutes the actuator stroke. It is possible, by suitable choice of parameters, to actuate through a wide range of pressures, as can be seen by referring to Table V above.

It can be seen that this device presents a very compact and self-contained actuator unit and can therefore be made small and light in weight.

EXAMPLE 1

In an example of actual operation, the device 49 to be actuated required a pressure of at least 2.5 atmospheres and a stroke of 6 cm. for its motion. Suppose the maximum pressure exerted by the spring 45 against the piston 41 is 2.6 atmospheres. Then $2.6+2.5=5.1$ atmospheres of internal pressure to be developed in the loading chamber 37.

Where the effective area of the piston, $A_{eff}$ is 5 cm.$^2$, the change of volume required is:

$$\Delta V = L A_{eff} = 30 \text{ cc.}$$

Suppose $P_0 = 1$ atm.,
$T_0 = 20°$ C.,
$V_0 = 50$ cc. = initial volume of loading chamber, and
$T = 200°$ C.

Also suppose that vanadium hydride is employed as the gas-transfer agent 40. From Table V under these conditions, it is found that $$\Delta V = 37.2 V_h - 0.2 V_0$$

Then $$V_h = \frac{30 + 0.7 \times 50}{37.2} \text{ cc.}$$

or $$V_h = 1.75 \text{ cc.}$$

Hence, by inserting 1.75 cc. of fully ingassed vanadium hydride into the loading chamber 37 of the unit 30 having the above dimensions, and by heating the hydride 40 to 200° C., the desired effect will be achieved. Note that, since the reaction is perfectly reversible, the piston 41 will return to its original position if the temperature is reduced to the value corresponding to $P = 2.5$ atmospheres.

THE DUAL-UNIT ACTUATOR 50 OF FIG. 3

Figure 3:
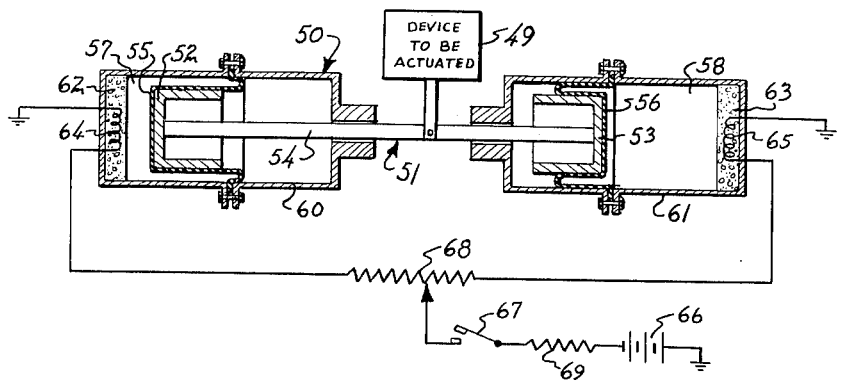
FIG. 3 is a view like FIGS. 1 and 2, showing a dual-unit reciprocating actuator embodying the principles of the present invention.

A dual-unit reciprocator actuating device 50 is shown in FIG. 3. A double-ended piston 51, comprising piston heads 52 and 53 connected by a stem 54, is fitted on each end with a diaphragm 55, 56, each like the diaphragm 31 of FIGS. 1 and 2, and defining loading chambers 57 and 58, respectively, in cylinders 60 and 61. Each loading chamber 57 and 58 is provided with a suitable gas-transfer agent 62, 63, such as a Group B hydride, whose temperature is controlled by an electrical circuit. For this purpose, filaments 64 and 65 may be connected to a battery 66 through a disconnect switch 67, a potentiometer 68, and a current-limiting resistor 69.

The circuit is arranged as a voltage-divider network, so that, as the potentiometer 68 is varied, the temperature of one gas-transfer agent will increase while that of the other gas-transfer agent will decrease. Hence, by employing suitable amounts of Group B hydrides as gas-transfer agents, a pressure differential may be applied to the double-ended piston 51 by virtue of the pressure difference in the loading chambers 57 and 58. Thus the piston 51 will seek a position such that equal forces are exerted on it at both ends 52 and 53. This position is controlled by the setting of the potentiometer 68 and thus the equilibrium position of the piston 51 may be said to follow the potentiometer 68. The device 49 to be actuated is connected to the center of the piston stem 54, and its position is controllable by the potentiometer setting.

It can be seen that the actuator 50 eliminates the need for the return spring 45 of the actuator 30. Furthermore, the piston 51 may be made to execute reciprocal motion either by alternating the potentiometer setting or by controlling the setting by means of a suitable mechanical device. Or, as will be seen later, the temperatures of the gas-transfer agent may be controlled independently by such means as high frequency generators. My invention employed in this manner is capable of a wide variety of applications and has the advantage over conventional systems that almost an infinite number of operating pressures and temperatures are available. For instance, I have presented herewith a positioning control that could be applied to almost any of the countless positioning applications in industry, especially the aircraft industry for such tasks as rudder and flap control, windshield wiper control, etc.

EXAMPLE 2

As a specific example of the use of the actuator 50, equal amounts of titanium hydride are employed as the gas-transfer agents 62 and 63. The conditions for a certain size of unit require a pressure of 204 atmospheres to be developed alternately in each loading chamber 57 and 58, and the electrical parameters are such that, initially, the temperature of each gas-transfer agent 62, 63 is 20° C. The potentiometer 68 can be varied so that a temperature of 1000° C. may be applied alternately to each source.

Then, for one loading chamber, let:

$V_0 = 40.8$ cc.
$V_h = 1.84$ cc.
$P_0 = 1$ atm.
$T_0 = 20°$ C.
$P = 204$ atm.
$T = 1000°$ C.
$A_{eff} = 6$ cm.$^2$ Referring to Table V, it may be seen that, under these conditions, for one loading chamber:

$$\Delta V = 38 V_h - 0.98 V_0 = 38 \times 1.84 - 0.98 \times 40.8 = 30 \text{ cc.}$$

Then $$L = \frac{30}{6} = 5 \text{ cm.}$$

Thus by producing a temperature of 1000° C. in one of the gas-transfer agents 62 or 63, say the agent 62 in the loading chamber 57, an internal pressure of 204 atm. would be developed, and the piston 51 would move to the right a distance of 5 cm. A possible limitation on this stroke would be due to the pressure developed in the loading chamber 58 upon compression, but this back pressure is not greater than 6 atm. if the temperature of the gas-transfer agent 63 is no higher than 20° C. during the compression stroke. Thus the length of stroke will be 5 cm. If the potentiometer setting is changed so that a temperature of 1000° C. is applied to the gas-transfer agent 63 in the loading chamber 58 while the gas-transfer agent 62 in the chamber 57 cools, the piston 51 will then move to the left toward the loading chamber 57 a total distance of 10 cm., since it will move 5 cm. to recover its initial equilibrium position and then an additional 5 cm. because of the pressure effects in the chamber 58. Hence the total length of stroke is 10 cm. and exerts a pressure of 204 atm. The cycle may, of course, be repeated by reversing the temperatures of the gas-transfer agents again. The action described has been one of reciprocal motion; however, if the potentiometer 68 is left at any of the intermediate settings, so as to produce desired temperatures at each source element, the device may behave as a single-position control. Of course, a continuous range of pressure may be obtained simply by suitable choice of container dimensions and source elements.

THE SINGLE-TYPE ACTUATOR 70 OF FIGS. 4 AND 5

Figure 4:
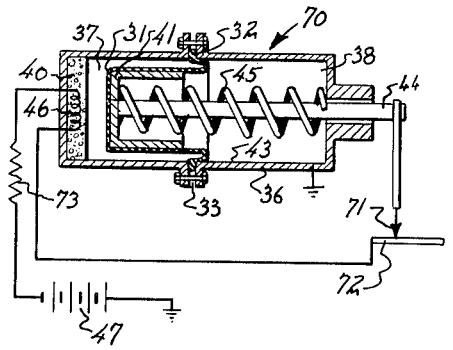
FIG. 4 is a view like FIG. 1 of a modified form of a single-unit reciprocating actuator of this invention, shown in its contracted position.
Figure 5:
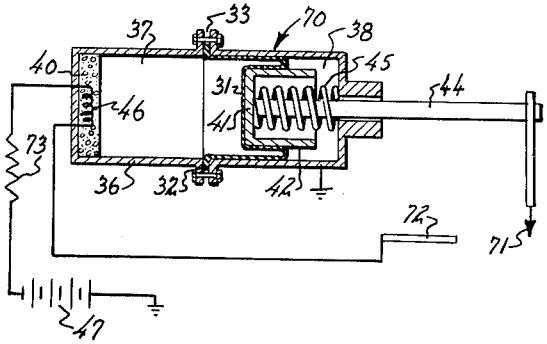
FIG. 5 is a view like FIG. 4, showing the same actuator in its extended position.

FIGS. 4 and 5 show a single-type actuator 70 of the same general structure as the actuator 30 of FIG. 1, with identical reference numerals used for identical parts. The difference is that, in FIGS. 4 and 5, the heating circuit contains an off-on switch comprising a sliding contact 71 and a stationary contact 72. A current-limiting resistor 73 is also used, so that external control of the battery current is unnecessary. Suppose, for illustration, that when the piston 41 is in the fully contracted position, the sliding contact 71 which is fastened to the piston stem 44 completes the battery circuit through the fixed contact 72. Then, by virtue of the heating effect on the gas-transfer agent 40, gaseous emission occurs, and the piston 41 moves against the force of spring 45. If the temperature and the gas-transfer agent 40 are chosen properly, the piston 41 will continue to extend until the contact 71 slides off the fixed contact 72, thus interrupting the circuit. The temperature of the gas-transfer agent 40 will then drop, and thus the agent 40 will ingas, and a consequent reduction in internal pressure will occur. Hence the spring 45 will return the piston 41 to its contracted position. When this occurs, the sliding contact 71 again contacts the fixed contact 72, thus completing the heating circuit; so the temperature of the gas-transfer agent 40 will again rise, and the cycle will be repeated. Therefore, a reciprocating motion will occur, and this motion does not depend upon external control.

EXAMPLE 3

The following conditions of operation of the actuator 70 are intended to illustrate the low temperature ranges at which my invention will operate.

Suppose that the actuator 70 has a loading-chamber pressure of 10 atm., operating in the range of −30° C. to 0° C. The initial conditions are $P_0 = 1$ atm., $T_0 = -30°$ C. Then let $$P = 10 \text{ atm.}$$
$$P_0 = 1 \text{ atm.}$$
$$T_0 = -30° \text{ C.}$$
$$T = 0° \text{ C.}$$

It may be seen from Table V that, by employing vanadium hydride as the source element, the equation for $\Delta V$ is:

$$\Delta V = 0.89 V_h - 0.88 V_0$$

Suppose $$V_0 = 1000 \text{ cc.}$$
$$V_h = 1000 \text{ cc.}$$
$$A_{eff} = 5 \text{ cm.}^2$$

Then $\Delta V = 0.89 \times 1000 - 0.88 \times 1000 = 10$ cc. and we find that $$L = \frac{10}{5} = 2 \text{ cm.}$$

Thus a stroke of 2 cm. is obtained when operating in these lower temperature ranges. One of the advantages of my invention, as illustrated in this example, is the extreme simplicity of the control circuits necessary for its operation. Obviously great economy, simplicity and lightness of weight, as compared to conventional systems, may be achieved by using my invention.

THE ACTUATOR 80 USED TO OPERATE A WINDSHIELD WIPER (FIG. 6)

A modified dual-unit reciprocator-type actuator 80 can operate a windshield wiper 81, as shown in FIG. 6. Here the actuator 80 is similar to that shown in FIG. 3, and identical numbers are used for identical parts. The actuator 80 is connected to windshield-wiper arms 82, 83 through a drive mechanism 84. The difference between the actuator 50 shown in FIG. 3 and the actuator 80 of FIG. 6 is that, while in FIG. 3 the temperatures of the gas-transfer agents 62 and 63 are controlled by the setting of the potentiometer 68, the temperatures of the gas-transfer agents 62, 63 in FIG. 6 are controlled by means of double-pole, double-throw pressure switches 85 and 86, which include a pressure-sensitive member 87 mounted in each loading chamber 57, 58.

In FIG. 6, suppose the double-ended piston 51 is originally in the position shown, that is, contracted in the cylinder 60 and extended from the cylinder 61. When an initiating push-button switch 90 is depressed, current from the battery 66 can flow through line 91, normally closed switch pole 92 of the switch 86, and line 93 to the filament 64, and thence return to the battery 66 via lines 94 and 95, switch 90, and lines 96 and 97. Thus, the temperature of the gas-transfer agent 62 is raised, and the resultant gaseous emission in loading chamber 57 moves the piston 51 to the right and compresses the gas in the loading chamber 58 of the cylinder 61.

When the pressure in the loading chamber 58 is raised to a sufficient value, the pressure switch 86 is activated, closing a switch arm 98 and opening the switch arm 92. When the switch 93 is opened, the circuit to the filament 64 is broken and the gas-transfer agent 62 begins to cool, with consequent decrease of pressure in the loading chamber 57. Since the switch arm 98 is closed, the current may now flow from the battery 66 through the line 99, and switch 98, and line 100 to the filament 65, and thence via line 101, normally closed switch element 102 of the switch 85, and line 103, to the battery 66. Since the gas-transfer agent 62 is cooling and ingassing, while the temperature of the gas-transfer agent 63 is rising, the piston 51 moves to the left.

When the gas in the chamber 57 is compressed to a certain pressure, the switch 85 is activated, thus closing a switch arm 104 and opening the switch element 102. Meanwhile, the decrease of pressure in the chamber 58 causes the switch 86 to open, thus closing the switch element 92 and opening the switch element 98, and therefore preventing current flow to the filament 65. Now the current flows from the battery 66 through the line 91, switch 92, and line 93 to the filament 64, then back to the battery 66 through the line 94, line 105, switch 104, and lines 106 and 97; so the switch 90 can be released once the cycle has been started; e.g., when the switch 86 is first thrown.

Thus the piston 51 is in position to begin a new cycle, while now it is unnecessary to depress the push-button switch 90; hence, a reciprocal action of the piston 51 is obtained. The piston 51 is connected to the windshield-wiper mechanism 81 through a control arm 84. The wiper arms 82 and 83 are pivoted about fixed points 107 and 108, while the control arm 84 has pins 110 and 111 engaging slots 112 and 113 in the lower ends of the wiper arms 82, 83. The control arm 84 follows the reciprocating motion of the piston 51 and hence drives the wiper blades 82, 83 back and forth across a wiping arc 114, 115.

EXAMPLE 4

As an example of operation of the actuator 80, suppose the requirements for actuation are a loading-chamber pressure of 5.1 atmospheres at a source temperature of 200° C. The initial conditions are $P_0=1$ atm.; $T_0=20°$ C. The electrical circuit parameters are chosen so that, when current is applied to either of the gas-transfer agents 62 or 63, their temperature will be 200° C. Assume equal amounts of vanadium hydride are used as the gas-transfer agents. Pressure switches 85 and 86 are identical and cut in at 5.2 atm., cut out at 5.0 atm.

Then for one loading chamber:

$V_h = 2.69$
$V_0 = 71.4$ cc.
$P_0 = 1$ atm.
$T_0 = 20°$ C.
$P = 5.1$ atm.
$T = 200°$ C.

It may be seen from Table V that, under these conditions:

$\Delta V = 37.2 V_h + 0.7 V_0 = 37.2 \times 2.69 - 0.7 \times 71.4 = 50$ cc.

and if $A_{eff} = 10$ cm.$^2$ then we find that $$L = \frac{50}{10} = 5 \text{ cm.}$$

Thus the piston 51 will extend 5 cm. from each side of its equilibrium position, and the total length of stroke will be 10 cm.

OTHER HEAT SOURCES MAY BE USED (FIGS. 7–10)

Heat may be applied to the gas-transfer agent in many different ways. In the previous examples, a D.C. source of heat was employed merely for illustrative purposes. Actually, as formerly stated, any source of heat may be used. The following examples are intended to provide illustrations of a few of the many other sources of heat which may be used.

In FIG. 7 a gas-transfer agent 120 in a cylinder 121 is heated by an A.C. current generator 122, applied to a filament 123, which is embedded in the agent 120.

In FIG. 8, a gas-transfer agent 125 in a cylinder 126 is heated by an inductive heating circuit consisting of a high frequency generator 127 applied to an inductive heating coil 128 which is either embedded in or surrounds the gas-transfer agent 125.

In FIG. 9, a gas-transfer agent 130 is heated by a flame 131 that warms the heat-conducting walls 132 of the cylinder head 133.

In FIG. 10, a gas-transfer agent 134 is heated by a solar concentrator consisting of a lens 135 which serves to focus rays from the sun upon a reflector 136. Lenses 137 and 138 serve to direct the rays from the reflector 136 to the gas-transfer agent 134 to the heat-conducting cylinder walls 139. This device serves to increase the energy density in certain desired areas, i.e., at the agent 134.

Although the gas-transfer agent may be heated by a filament in direct contact with the hydride, it may be desirable to heat the hydride indirectly, in one of the manners presented later.

AN ACTUATOR WITH CANTILEVER-TYPE BELLOWS (FIGS. 11 AND 12)

Figure 11:
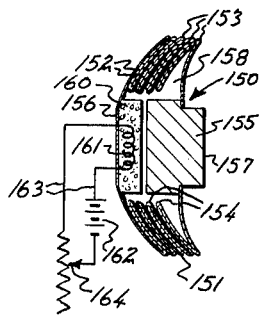
FIG. 11 is a view in side elevation and in section of a modified form of actuator of this invention, incorporating a single unit cantilever bellows. The bellows is shown in its contracted position with an electrical heater indicated diagrammatically.
Figure 12:
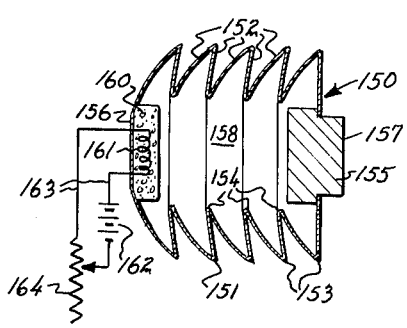
FIG. 12 is a view like FIG. 11, but shows the bellows in its extended position.

Another actuator 150 of variable dimensions, suitable for the employ of my invention and depicted in FIGS. 11 and 12, employs what is called a cantilever-type bellows 151. The bellows 151 comprises several flat annular sheets 152 of suitable refractory material or fabric which are joined alternately on their outer periphery 153 and inner periphery 154, thus forming the flexible bellows. The bellows 151 can be sealed at both ends by end members 155, 156. The end member 156 may be stationary while at the other end the member 155 is free to move and may contact the member to be actuated (not shown) when the pressure inside loading chamber 158 is increased by heating a gas-transfer agent 160 of the unit, as by a filament 161, battery 162, leads 163, and potentiometer 164. When the internal pressure in the chamber 158 is increased, the bellows 151 expands to an equilibrium position (FIG. 12). When the internal pressure is released, the bellows 151 will contract (FIG. 11).

EXAMPLE 5

As an example, let us suppose the actuation requires a pressure of 2500 atmospheres in the loading chamber 158. I shall choose other values arbitrarily.

Let $P = 2500$ atm.
$T = 2000°$ C.
$V_0 = 100$ cc.
$P_0 = 1$ atm.
$T_0 = 20°$ C.
$V_h = 100$ cc.
$A_{eff} = 23.6$ cm.$^2$ By employing titanium hydride as the source element, it may be seen by referring to Table V that $\Delta V = 6.9 V_h - V_0 = 5.9 \times 100 = 590$ cc.

and $$L = \frac{590}{23.6} = 25 \text{ cm.}$$

Thus a stroke of 25 cm. is obtained with a pressure of 2500 atm. and temperature of 2000° C. These figures are formidable when contrasted with actual operating conditions of conventional systems. At the same time, the construction demonstrates the extreme simplicity of design involved.

It is worth while to mention here that the hydrides of Group B have the advantage over conventional fuels and fluids that, at ordinary temperatures, they are relatively stable, resulting in a consequent ease of handling and elimination of fire hazard, as long as oxygen does not come in contact with the system.

APPLICATION OF THE ACTUATOR 150 (FIGS. 13–14)

The actuator 150 may be used as a shock absorber or stiffness control, whose damping factor is externally variable.

Figure 14:
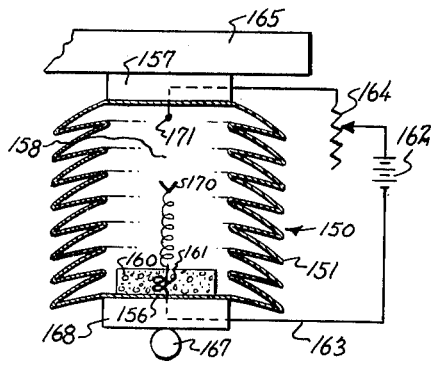
FIG. 14 is a view like FIG. 13 but showing the bellows in its extended position.
Figure 13:
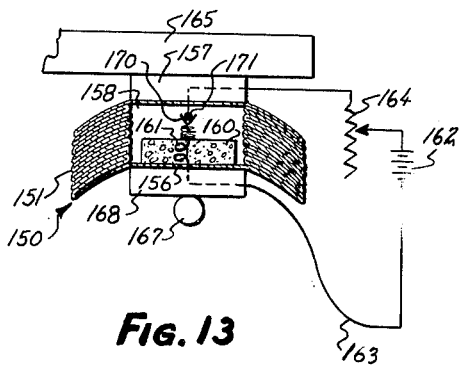
FIG. 13 is a view in side elevation and in section of a cantilever type of actuating device employed as a shock absorber and gas spring, with control by the variation in voltage of an electrical heater. The bellows is shown in its contracted position.

In FIGS. 13 and 14, the cantilever-type bellows 151 is shown attached by its mounting plate 157 to a frame or support 165. The other end 156 of the bellows 151 is attached to an axle 167, or any object capable of imparting an upward impulse to the bellows 151, through a support plate 168. A suitable gas-transfer agent 160 is mounted in the loading chamber 158, with the spiral filament 161 embedded within the gas-transfer agent 160. (The gas-transfer agent 160 and plate 157 are in the other end of the bellows 151 from that in FIGS. 11 and 12.) A free end of the filament 161 terminates at a spring contact 170 inside the loading chamber 158. The other end of the filament 161 is brought out through the support plate 168 and a flexible conductor 163 leads to the battery 162. The other side of the battery 162 is connected to the rheostat 164 and thence continues through the backing plate 157 to the loading chamber 158, where the conductor terminates in a contact 171. Normally, the contacts 170 and 171 (as shown in FIG. 14) do not touch, but they are arranged in such a manner that, when the bellows 151 is compressed a specified amount, the contacts 170 and 171 will touch so as to complete the electrical circuit.

With the normal position of contacts 170 and 171 such that the electrical circuit is not completed, assume that an impulse is imparted to the axle 167 in such a direction as to compress the bellows 151. The contacts 170 and 171 will then meet, depending upon the particular dimensions involved, and thereby complete the battery circuit. The resulting flow of current through the filament 161 heats the gas-transfer agent 160, and outgassing occurs with a consequent increase of pressure in the loading chamber 158. If this pressure is sufficient to overcome the impulse, the bellows 151 will expand and thus tend to damp the impulse. The expansion will continue until the circuit is broken by the contacts 170 and 171 moving apart. Since the damping will be some function of the internal pressure in the loading chamber 158, and thus of the source temperature, the damping is controllable by the rheostat 164 because it controls the temperature of the gas-transfer agent 160. Hence, the rheostat 164 may be designated the damping control.

This system of shock control offers many advantages over conventional systems, particularly in regard to bulk and cost. The employ of my invention in this connection again demonstrates the extreme simplicity of its operation and use. Present day air-shock control systems are generally bulky and usually require an external supply of gas to alter the internal chamber pressure as well as requiring various flow and check valves, etc. This, of course, may be dispensed with in my design, with resultant economy. One of the primary factors in withholding air-shock control suspensions from use in the passenger car industry is the expense involved. The present invention make it inexpensive enough for use on passenger cars. Some other advantages are that it keeps an auto level despite road and load conditions, and prevents "nose dive" when coming to sudden stops.

Similar results may be obtained by mounting the material 160 on the fixed member (e.g., the end 157), and there would then be less weight on the movable portion of the system.

EXAMPLE 6

As an example of operation of the system of FIGS. 13 and 14, suppose that to counteract in impulse a pressure of 204 atm. is required in the loading chamber 158 and that the bellows 151 must extend 6 cm.

Then, if the following conditions are chosen, and if zirconium hydride is employed as the gas-transfer agent 160, $V_0 = 100$ cc.
$V_h = 95$ cc.
$T_0 = 20°$ C.
$P_0 = 1$ atm.
$T = 600°$ C. adjustable by the damping control 164
$P = 204$ atm.

then from Table V it may be seen $\Delta V = 1.11 V_h - 0.98 V_0 = 104 - 98 = 6$ cc.

Thus, if $A_{eff} = 1$ cm.$^2$ then by Formula 5

$$L = \frac{\Delta V}{A_{eff}} = 6 \text{ cm.}$$

and the desired result has been achieved. If the extension desired is less than 6 cm., then all that need be done is to lower the operating temperature by means of the damping control 164.

ALTERNATE METHOD OF OPERATING CANTILEVER BELLOWS 151 (FIGS. 15–16)

Figure 15:
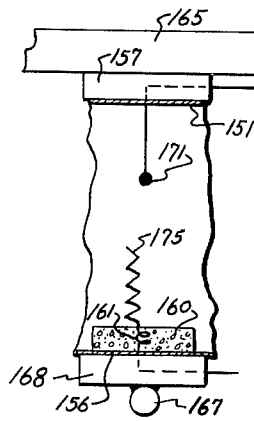
FIG. 15 is a fragmentary enlarged view showing a modification of the contact elements of FIGS. 13 and 14, the contacts being shown in their open position.
Figure 16:
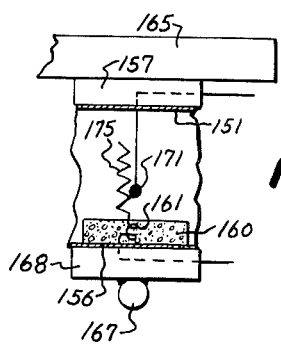
FIG. 16 is a view like FIG. 15, showing the contacts in their closed position.

FIGURES 15 and 16 show one of the many alternative methods of varying the electrical circuit of FIGS. 13 and 14. In FIGS. 15 and 16 the circuit is identical with that of FIGS. 13 and 14, except that the electrode 170 of FIG. 14 is replaced by an electrode 175 which is constructed in the form of a resistance. When contact between the electrodes 171 and 175 is made, the series resistance of the circuit will be altered, since the electrode 171 slides on the electrode 175, which presents variable resistance to the circuit. Hence, as the electrodes 171 and 175 move closer together, more current will be passed through the coil 161, causing a larger gas emission from the gas-transfer agent 160, which results in a larger pressure in the chamber 158 and consequently tends to expand the bellows 151. With appropriate resistance chosen for the electrode 175, a wide range of current through the coil 161 may be chosen. One advantage of the construction of FIGS. 15 and 16 is that it incorporates its own ride control in the form of the electrode resistance; that is, the more the bellows 151 is compressed, the greater will be the resultant pressure within the chamber 158 tending to oppose the cause of the motion.

A MODIFIED ACTUATOR 200 (FIG. 17)

FIG. 17 illustrates a simple diaphragm-type actuator 200 which utilizes the principles of this invention In FIG. 17, a non-porous flexible diaphragm 201, such as phosphor bronze (only a portion of which is shown), is secured to a non-porous support structure 202 which contains a well 203 wherein particles of a suitable gas-transfer agent 204, such as titanium hydride, are inserted along with a heating coil 205, whose leads 206, 207 are brought outside of the well-container 203 to terminals 208 and 209 where a suitable source of electrical power is to be connected. The well 203 of the support structure 202 is then covered by a thin, porous membrane 210, such as porous ceramic, which serves to keep the gas-transfer agent 204 within the well 203 but yet allows gaseous emission from the agent 204 to escape from the well 203 into the diaphragm chamber 211.

In operation, the gas-transfer agent 204 is heated by the rise in temperature of the heating coil 205 due to the current flowing through it from the terminals 208 and 209. The temperature of the gas-transfer agent 204 may thus be varied by varying the current. Since the amount of gaseous emission from the gas-transfer agent 204 is a function of its temperature, the resultant gas pressure in the region 211 due to the gas passing through porous membrane 210 is also a function of the current. Thus the pressure in the region 211 may be altered by the simple expedient of variation of the current connected to the terminals 208, 209. As a result, the diaphragm 201 will flex back and forth, depending upon the variation of current through the coil 205. When the current flow ceases, the diaphragm 201 will return to its normal position, due to the resultant ingassing of the gas-transfer agent 204.

A FLAME-OUT CONTROL ACTUATOR (FIG. 18)

Figure 18:
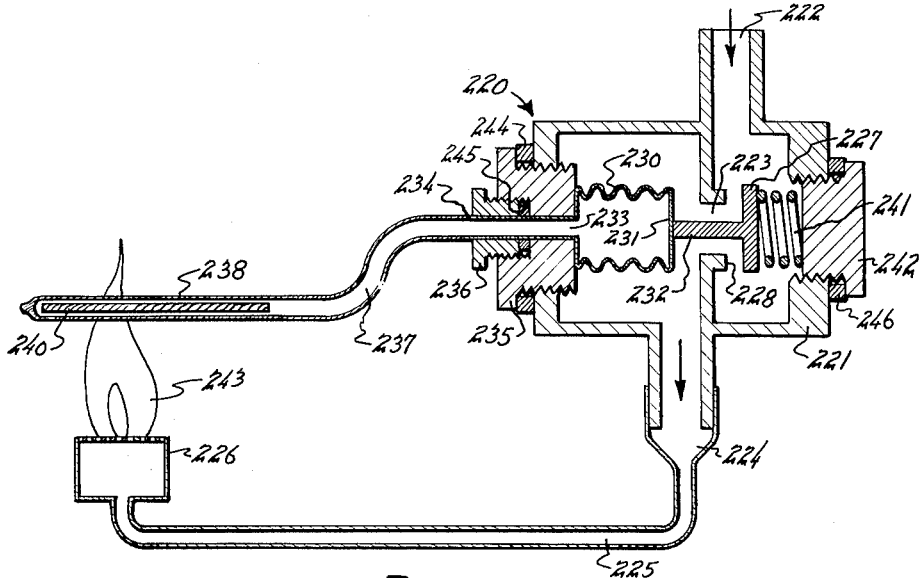
FIG. 18 is a view in side elevation and in section of a flow-regulating device incorporating an actuator of this invention.

FIG. 18 shows a device 220 useful for preventing gas flow into regions where it would be unsafe or where it is undesirable. This device 220, which may be called a flame-out control, is essentially a getter-operated valve. It comprises a main body 221 through which gas may flow from an inlet 222 through a valve opening 223 to an outlet 224. A pipe 225 is connected to the outlet 224 and terminates in a burner assembly 226. Gas is prevented from flowing to the burner 226 when the valve opening 223 is closed by a valve-closure member 227 engaging an annular valve seat 228.

The valve 227 is actuated by a bellows 230, which may be of the cantilever type, sealed at one end 231, which abuts against one end of a valve stem 232. A valve 227 is permanently secured to the other end of the stem 232. A port 233 at the other end of the bellows 230 is attached to a non-porous tube 234, so that the interior of the bellows 230 and the interior of the tube 234 enjoy a common atmosphere. The tube 234 may be brought out of the main body 221 through nuts 235 and 236, as shown, which facilitate the easy removal and/or replacement of the tube 234 and bellows 230, as will be explained later. Seals 244 and 245 prevent gas leakage past nuts 235 and 236. The other end of the tube 234 is connected by a non-porous flexible portion 237 to a vial 238, which may be of non-porous ceramic, inside of which is placed a gas-transfer agent 240. The agent 240 is preferably fully ingassed heat-dissociable material in powdered form or in a filamentary form. For example, the agent 240 may be powdered titanium hydride or titanium-hydride wire fully ingassed with hydrogen.

The actuator thus comprises the bellows 230, tube 234 with its flexible tubing 237, ceramic vial 238, and heat-dissociable material 240 and may be assembled as a unit at the factory prior to installation in the main body 221. The entire interior region of the actuator is evacuated of all gases except what is contained within the fully ingassed heat-dissociable material 240. To install the actuator assembly into the body 221, the nuts 235 and 236 are removed and the vial 238 and tube 234 are inserted through the nuts 235, 236; then the nuts 235, 236 are reinserted into the main body 221 and tightened to seal the actuator into the body 221. Preferably, the valve closure member 227 is spring-loaded by means of a spring 241, and a nut 242 is provided to facilitate removal or replacement of the valve and stem 227, 232 and the spring 241, as well as adjustment of the spring 241. A seal 246 prevents gas flow past the nut 242.

The valve 227 is actuated as follows: Heat applied to the ceramic vial 238 penetrates to the heat dissociable material 240 and causes gaseous emission. Since the gas is confined to the interior region of the actuator, its internal pressure rises, and the bellows 230 expands, forcing the valve closure member 227 away from the seat, against the resistive force of the spring 241. Gas can then flow from the inlet 222 to the burner 226 through the opening 223. If the heat initially applied to the ceramic tube 238 is from a flame, such as that produced by a lighted match, then the gas which subsequently emerges from the burner 226 will be ignited, producing a flame 243 which envelops the ceramic vial 238. The valve opening 223 will remain open as long as the flame 243 continues to heat the ceramic vial 238, so that gas will flow from the inlet 222 to the burner 226 all this time. If, however, the flame 243 should be extinguished, accidentally or otherwise, the heat-dissociable material 240 will cool, and as a result will ingas and reduce the internal pressure of the actuator, so that the spring 241 can then push the valve 227 against the seat 223, thereby preventing gas flow to the burner 226. Thus the mechanism can function as an automatic gas shut-off control, which prevents the serious hazard which would be generated by unmonitored or free gas flow through the burner 226. Of course, the flame 243 may be used for various purposes in addition to acting on the vial 238. It may be a pilot burner, for example, in a furnace or hot water heater, or it may be the main flame of a burner.

If desired, a non-porous glass vial may be used in lieu of ceramic vial 238. Many other alternative methods of constructing this device will suggest themselves, without departing from the spirit and scope of the invention.

In FIGS. 1–16, 18, and 19, the diaphragm-type actuators and cantilever-type bellows actuators are interchangeable, though for a particular application one may be far preferable to the other.

Figure 19:
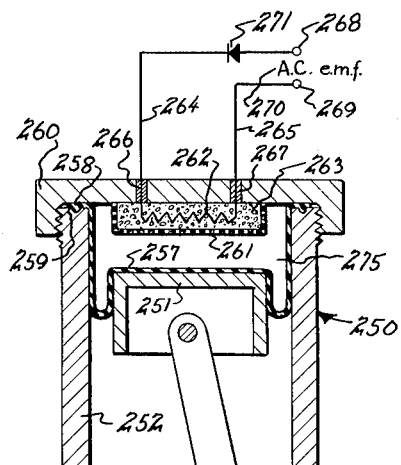
FIG. 19 is a diagrammatic view in side elevation and in section of a piston-cylinder type of actuator, embodying the principles of this invention.
Figure 20:
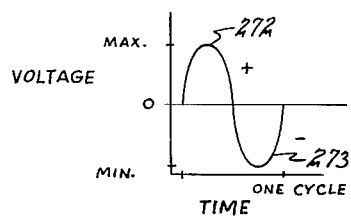
FIG. 20 is a diagram of an electrical wave form (current or voltage plotted against time) that may be used in the actuator of FIG. 19.

PISTON-DRIVING ACTUATOR (FIGS. 19 and 20)

FIG. 19 illustrates another highly useful application of my invention. In this instance, an actuator 250 drives a piston 251. A non-porous cylinder 252, preferably metal, is provided with a loose-fitting piston 251 connected to a crankshaft 253 by means of a piston rod 254 and crankpin 255. A flywheel 256 is provided on one end of the crankshaft 254. The piston 251 is in contact at its upper end with a non-porous flexible diaphragm 257 of the type shown in FIGS. 1 and 2. The rim 258 of the diaphragm 257 is sealed to the top 259 of the cylinder 252 by a non-porous cap 260. Directly underneath the cap 260 is secured a porous container 261, which may be porous ceramic. A heating coil 262 and a suitable amount of a gas-transfer agent 263 (for example, fully ingassed titanium-hydride) is placed inside of the container 261, and the leads 264, 265 for the coil 262 are brought out of the cap 260 through hermetic seals 266 and 267 and terminate at contacts 268 and 269, across which an alternating current E.M.F. 270 is placed. The porosity of the container 261 keeps the particles of the gas-transfer agent 263 from escaping, but will permit gas to flow freely through it. A rectifier 271 may be provided in the lead 264.

In operation, the alternating current E.M.F. 270 may have a wave form like that shown in FIG. 20. Assume, for example, that positive-voltage portions 272 of the current are passed by the rectifier 271, while the negative ones, 273, are prevented from flowing. When the first positive portion 272 of the current passes through the heating coil 262, the temperature of the gas-transfer agent 263 is elevated. As a result, gas is released from the agent 263 and passes through the porous container 261 into a loading chamber 275 of the cylinder 252. The internal pressure in this chamber 275 causes the diaphragm 257 to expand against the piston 251 and forces the piston 251 away from the container 261. The resulting movement of the piston 251 causes a rotary motion of the crankshaft 253.

When the current reverses, a negative pulse 273 is sent to the terminal 268 but is prevented from passing through the heater coil 262 by the rectifier 271; therefore, the gas-transfer agent 263 cools during this portion of the cycle. Meanwhile, the inertia of the flywheel 256 carries the piston 251 back up to the top of cylinder 252, while the gas-transfer agent 263 is cooling and therefore ingassing; so the pressure in the chamber 275 is reduced. This reduction in pressure helps to draw the piston 251 to the top of the cylinder 252.

With proper synchronization, when the piston 251 has reached the top of the cylinder 252, the gas-transfer agent 263 has been reingassed. At this point the current again reverses and sends a positive pulse 272 through the heater coil 262, resulting in repetition of the cycle previously described. Thus, continuous motion of the crankshaft 253 is obtained merely by applying suitable alternating current 270 at the terminals 268 and 269.

Although only one piston actuator 250 has been drawn, the method can obviously be extended to two or more piston actuators connected to the same or different crankshafts. The piston actuator 250 indicates in a striking manner the simplicity and practicality of this invention. This unit is entirely self-contained and operates without valves of any kind. The only external requirement is a suitable source of current 270.

The method of retaining the gas-transfer agent 263 inside of the porous container 261 is equally applicable to the constructions of FIGS. 1 through 16, where, in the description of these previous figures, no precise structure for holding the gas-transfer agents was described.

EXAMPLE 7.—USE OF GROUP A HYDRIDE IN THE ACTUATOR 150

In connection with the actuator of FIGS. 11 and 12, a "Group A" hydride, such as copper hydride, may be employed as the gas-transfer agent 160. Since the solution of hydrogen in Group A materials is an endothermic reaction, hydrogen will be liberated as the temperature of the hydride 160 is lowered, consequently the bellows 151 will expand to the position shown in FIG. 12 when current through the filament 161 is reduced. The bellows 151 will contract when this current is increased. In certain types of conditions this "reversed" type of operation may present advantages.

EFFECT OF OUTGASSING ON ELECTRICAL PROPERTIES OF THE HYDRIDE

For many applications it will be satisfactory for the hyrdide to be in direct contact with the filament, especially when low filament voltages and temperatures are employed. However, at high voltages and/or temperatures, shorts across the filament may occur. This is a result of a property of hydrides in general, namely, a change in electrical resistance when the gas content changes. For example, the resistance of titanium or zirconium hydride decreases as their hydrogen content decreases, so that filament temperatures that cause the hydride to outgas also lower its resistance to the point where an additional increase in current due to lowered resistance may generate undesired heat and cause serious electrical or mechanical leaking or may permanently damage or alter the operating characteristics of the system. Lowering pressures (at a given temperature) also result in outgassing the hydride and changing its resistance.

Several solutions to this problem follow.

INTIMATELY MIXING THE HYDRIDE WITH AN INSULATOR

One way of solving the problem just stated is to electrically insulate the hydride particles at all times, without inhibiting the passage of gas to or from the hydride. A unique way of accomplishing this is to intimately mix the hydride with a powdered insulating material such as microscopic alumina or quartz. In the construction of test units it was determined that ball-milling a mix of microscopic alumina and titanium hydride in equal parts by weight for several days produced very satisfactory results. Test assemblies employing filaments of 0.002" diameter tungsten wire embedded in this mix have periodically withstood high filament voltages and high current (e.g., 45 volts, 4 amps, at 15 p.s.i.g., cycling from room temperatures to 3000° F.) for periods in excess of one-half hour without mechanical or electrical failure or noticeable change in operating characteristics.

Additional advantages derived from the use of the hydride-insulator mix are that much less filament current is required to cause a given amount of gaseous emission than is necessary when unprepared hydride is used, indicating an increase in the energy transfer efficiency.

RADIANT HEATING OF THE GAS-TRANSFER AGENT

Figure 21:
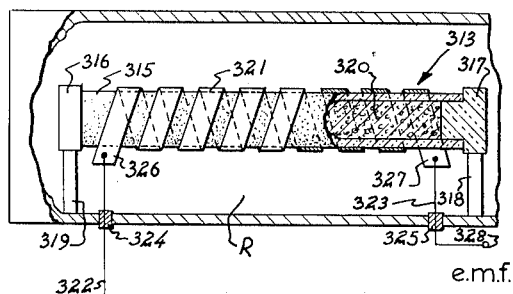
FIG. 21 is a view in elevation and in partial section of a heating capsule and some adjacent parts.

In FIG. 21 a heating capsule 313 is placed within a non-porous container 314 which might represent a section of cylinder 34 as shown in FIG. 1, or may be the well 203 of FIG. 17, for example. The capsule 313 comprises a quartz or sapphire tube 315 plugged at both ends with electrically insulating and porous caps 316 and 317, which are supported on the container 314 by means of brackets 318 and 319. The gas-transfer agent 320 is placed within the tube 315, and a tungsten, molybdenum, or other suitable filament 321 is wrapped around and against the periphery of the tube 315. Conductors 322 and 323 pass through feed-through insulators 324 and 325 and connect to the ends 326 and 327 of the filament 321. A suitable source of A.C. or D.C. current is connected to terminals 328 and 329. When current passes through the filament 321, energy from the hot filament is radiantly communicated through the walls of the tube 315 to the gas-transfer agent 320, whereupon, if titanium or zirconium hydride, for example, is employed as the gas-transfer agent, gaseous emission proceeds through the plugs 316 and 317 into the region R within the container 314. It is important that this region R does not contain oxygen or any other gas which might react unfavorably with either the gas-transfer agent 320 or the filament 321. A preferable atmosphere may be, as previously described, one composed of inert gases or of gas native to the hydride or gas-transfer agent 320.

This method of heating offers the advantage that the heating element never comes into direct contact with the gas-transfer agent 320 and hence is insulated at all times from the filament.

Figure 22:
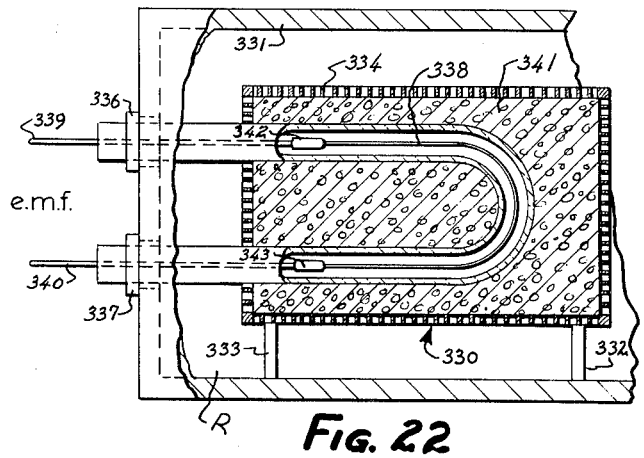
FIG. 22 is a view in elevation and in partial section of a modified form of heating unit.

A modified apparatus for radiantly heating the gas-transfer agent is shown in FIG. 22. Here a heating unit 330 is mounted to the walls of a non-porous container 331 by means of brackets 332 and 333. As in FIG. 21, the interior of the container 331 represents a portion of the region R in which it is desired to provide alteration of pressure. The heating unit 330 comprises a porous container 334 through which passes a quartz or sapphire tube 335. The ends of the tube are brought out of the container 331 through feed-through insulators 336 and 337. A filament 338 which may consist of tungsten or molybdenum wire or other suitable material passes through the center of the tube 335 and is connected to terminals 339 and 340. A suitable amount of gas-transfer agent 341 is placed in the container 334 around the tube 335. Current from an A.C. or D.C. source applied to terminals 339 and 340 heats the filament 338 which, in turn, radiantly transfers energy through the transparent walls of the tube 335 to the surrounding gas-transfer agent 341, and causes it to release hydrogen. The porosity of the container 334 is such that the gas-transfer agent 341 will be retained in the interior of the container 334, yet gas may flow freely through the container walls. Thus, the pressure in the region R of the container 331 may be altered. Here, again, the advantage of this type of construction is evident, for it is noted that the heating filament 338 does not come into direct contact with the gas-transfer agent 341.

Although the tube 335, shown in the interior of the container 334, has but one loop, several more loops may obviously be added to the tube; for example, the tube may be formed in a spiral or helical form to provide a greater heating area to the gas-transfer agent 341. The quartz or sapphire tube 335 may, for example, be 0.060" outside diameter and 0.040" inside diameter, while the tungsten or molybdenum filament 338 may be 0.003" or 0.004" in diameter. To prevent oxidation of the filament 338, copper leads 342 and 343 may connect the ends of the filament 338 to the terminals 339 and 340, and these leads 342, 343 are then sealed where they leave the tube 335.

HEATING THE HYDRIDE DIRECTLY

Figure 23:
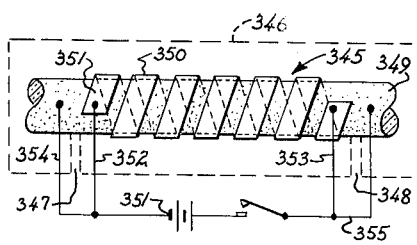
FIG. 23 is a view in elevation of another modified apparatus for heating the gas transfer agent.

In FIG. 23 a gas generating and heating unit 345 is placed in the interior of a container, represented by the broken line 346, and is mounted to it by means of insulated brackets 347 and 348. The unit 345 comprises the gas-transfer agent 349, such as titanium hydride, for example, in filamentary form. The agent 349 is wrapped with a ribbon-like helix 350, which in this case may be made from molybdenum.

In the unit 345 a unique property of hydrides is employed. The resistance of hydride materials to current is a function of the amount of gas taken up by the hydride. For example, it is known that the resistance of titanium or zirconium hydride decreases as the amount of hydrogen content of the hydride decreases. Thus, when the hydride 347 is initally in the ingassed state, it presents a comparatively high resistance to current flow. So, when the voltage or current source, which in this case is represented by a battery 351, is connected in parallel by leads 352 and 353 to the ribbon 350 and by leads 354 and 355 to the hydride agent 349, current will initially flow primarily through the ribbon 350, because it initially has the lower resistance. This causes the temperature of the hydride 349 to rise, and it releases hydrogen, thereby decreasing its resistance to current flow. At the same time, the increase in temperature of the molybdenum ribbon 350 causes an increase in its resistance. Thus, as the temperature of the unit 345 is raised, the current will have an increasing tendency to flow through the gas-transfer agent 349, in preference to the ribbon 350. Similarly, when the current through the ribbon 350 and the hydride 349 is reduced, the drop in temperature allows the hydride 349 to re-ingas, resulting in a higher resistance to current flow by the hydride 349 and a lower resistance by the ribbon 350. It is thus possible to choose the correct amount of hydride and ribbon materials so that the current flow through the whole unit 345 depends linearly upon the applied voltage.

An advantage of the use of molybdenum as the helical ribbon 350 is that, in case of possible welding between the molybdenum and the titanium hydride, for example, no undesirable effects occur. That is, alloying molybdenum with titanium does not seem to adversely affect the properties of these materials, so far as application to actuator use is concerned. As a matter of fact, the addition of small amounts of titanium to molybdenum increases the strength and ductility of the molybdenum. As in FIGS. 21 and 22, the atmosphere surrounding the element 345 should be one that does not contain gases which will react unfavorably with the hydride 349 or the ribbon 350.

HEATING THE GAS-TRANSFER AGENT BY ARC DISCHARGE

Figure 24:
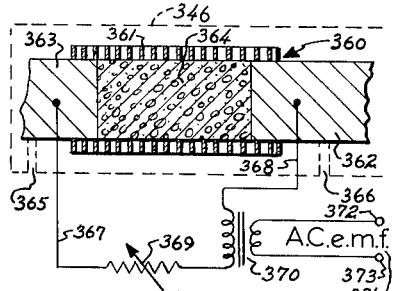
FIG. 24 is a diagrammatic view in elevation and in section of an arc-discharge heating capsule.

In FIG. 24 a discharge capsule 360 comprises a porous electrically insulating tube 361, which may be porous ceramic, which has at each end flat-ended metal electrodes 362 and 363, between which is located an amount of a suitable gas-transfer agent 346, such as titanium hydride, for example. The porosity of the tube 361 assures that the gas-transfer agent 364 will be retained inside while gas may pass freely through the walls. This capsule 360 is mounted by insulating brackets 365 and 366 to the container represented by the dotted lines 346, in which it is desirable to alter the internal pressure. Conductors 367 and 368 are connected to the electrodes 362 and 363 and are in series with a variable resistor 369 and the secondary of a transformer 370. An alternating current generator 371 is applied to primary terminals 372 and 373. As the voltage applied is increased in magnitude, a point is reached at which an arc discharge takes place between the electrodes 362 and 363, resulting in a momentary surge of current which may be of the order of several amperes. This large magnitude of current rapidly heats the gas-transfer agent 364 and causes gaseous emission. The gas passes through the walls of the container 361 into the interior of the container 346 and thus alters the pressure there. The arc discharge voltage is a function of the shape of the electrodes 362 and 363, which in this case are shown as flat-faced, but they may be any other suitable shape, for example, pointed. It also is a function somewhat of the distance between the electrodes and of the conductivity of the gas-transfer agent 364. This allows several parameters to be chosen to accommodate a wide range of arc discharge voltages. It has been explained previously that the form of the hydride introduced into the tube 361 has a marked effect upon the electrical characteristics of the system. If the hydride is ball-milled with an equal part by weight of alumina, the breakdown voltage between the electrodes will be greatly increased over that occurring when unprepared hydride is used. In cases where it is desirable to produce low voltage discharges, unprepared hydride may be used with considerable success. The voltage and current applied to the electrodes 362 and 363 are also variable and limited by means of the resistor 369.

Although the transformer 370 may be of conventional design, it may be a saturable reactor. When the secondary current of the saturable reactor transformer 370 increases to a certain magnitude, reaction takes place to limit the secondary current to a safe level. This provides a safety factor.

One particular advantage of the capsule 360 is that intense heat may be applied to the gas-transfer agent 364 over relatively short periods of time, and rapid outgassing of the agent 364 will take place. This permits rapid response of an actuator which uses this type of heating arrangement.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. In an actuator device, a gas-transfer capsule, comprising a generally cylindrical hollow container with electrically insulating walls, metallic hydride in said container, and an electrical heating filament wound around the outside of said hollow container.

2. In an actuator device, a gas-transfer capsule, comprising a porous-walled container, metallic hydride inside said container that emits hydrogen gas when heated, an electrically insulating tube inside said hydride, and an electrical heating filament inside said tube and thereby insulated from said hydride.

3. In an actuator device, a gas-transfer capsule, comprising a block of metallic hydride which is electrically conductive and whose conductivity changes when heated, said hydride emitting hydrogen when heated, an electrical heating filament wound around said block, and a source of electric current connected across said filament and, in parallel, across said block.

4. In an actuator device, a gas-transfer capsule comprising a porous, electrically insulating tube with electrodes at opposite ends thereof, metallic hydride in said tube between said electrodes, and means to cause an arc of discharge voltage between said electrodes.

5. An actuator comprising a gas-tight bellows; a metallic hydride in said bellows, which changes the internal pressure thereof by releasing quantities of hydrogen large in proportion to said hydride when the temperature of said hydride is changed; and means for heating said hydride.

6. An actuator comprising a gas-tight bellows; a hydride of the type that emits hydrogen when heated in said bellows; an electrical filament in said hydride; a source of electrical power; and a circuit connecting said source to said filament.

7. The actuator of claim 6 wherein said filament and said hydride are located at one end of said bellows and said circuit includes a first switch element extending from said filament inside said bellows and a second switch element inside said bellows supported by the opposite end of said bellows, for breaking said circuit when said bellows expands a predetermined amount and closing said circuit when said bellows contracts a predetermined amount.

8. The actuator of claim 7 wherein said first switch element comprises a resistance element so as to increase the heat energy applied to said filament as said second switch element moves closer to said filament, after contact with said first switch element.

9. An actuator comprising a pair of coaxial containers each closed except on one end; diaphragm means for each container closing that end so as to make each said container gas-tight and enclosing therewith a loading chamber; a charge of metallic hydride in each said chamber to release hydrogen gas upon a change in temperature in one direction and to take up gas upon a change in temperature in the opposite direction; electrical heating means for each said container for changing the temperature of said metallic hydride; a switch in each said container that is closed when its diaphragm reaches an extreme position, reciprocating shaft means extending along the common axes of said containers and operatively connected to both said diaphragms for movement with them; and electrical circuit means including said switch means for turning off the electrical heating means in one said chamber and turning on the electrical heating means in the other said chamber each time a said switch means is closed at the extreme position of the diaphragm.

No references cited.

SAMUEL LEVINE, *Primary Examiner.*